Oct. 6, 1970   E. N. CALDWELL   3,531,994
APPARATUS FOR MEASURING A PNEUMATIC SIGNAL IN A CONTROL SYSTEM
Filed March 10, 1969                      2 Sheets-Sheet 1

INVENTOR.
EDWARD N. CALDWELL
BY
HIS ATTORNEYS

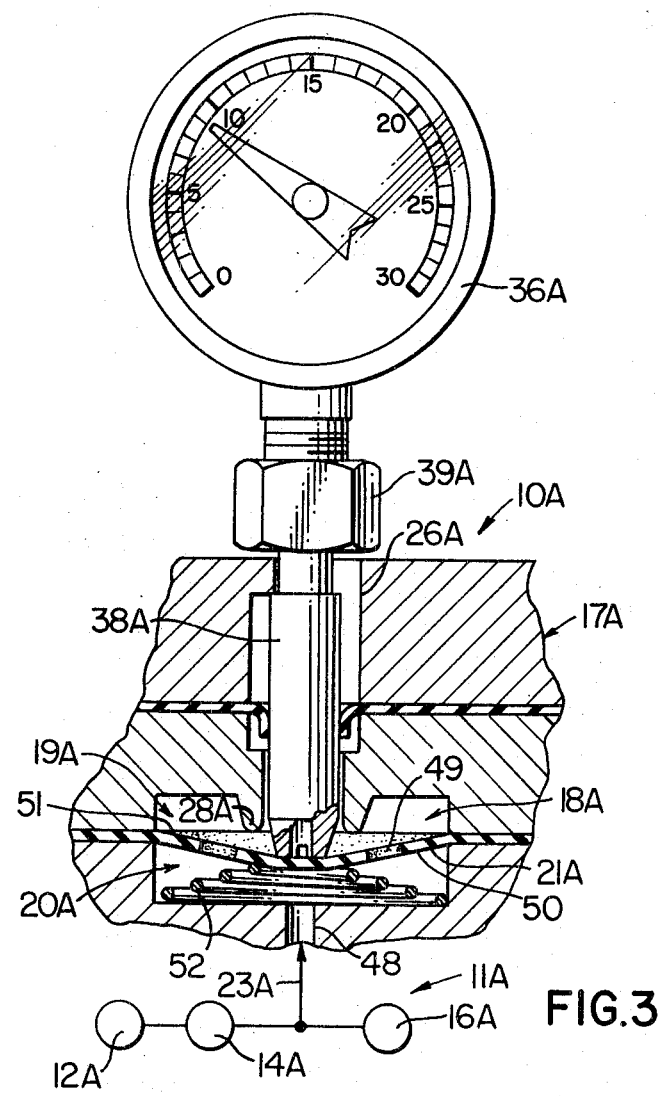
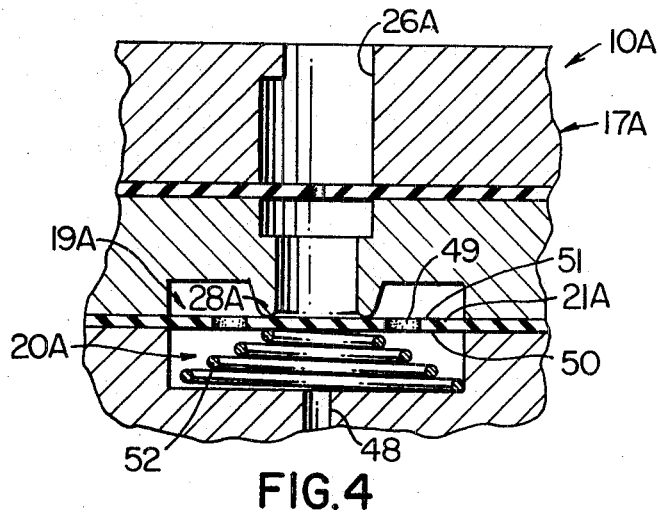

United States Patent Office 3,531,994
Patented Oct. 6, 1970

3,531,994
APPARATUS FOR MEASURING A PNEUMATIC SIGNAL IN A CONTROL SYSTEM
Edward N. Caldwell, Knoxville, Tenn., assignor to Robertshaw Controls Company, Richmond, Va., a corporation of Delaware
Filed Mar. 10, 1969, Ser. No. 805,611
Int. Cl. G01l 7/00
U.S. Cl. 73—388                                        26 Claims

ABSTRACT OF THE DISCLOSURE

A housing having a chamber divided into two sections by a flexible diaphragm with an opening in the housing leading from the exterior thereof to one of the chamber sections. A gage plug is removably mounted in the opening for measuring fluid pressure in the one chamber section when the gage plug is disposed in the opening to move the flexible diaphragm away from a valve seat surrounding the opening and projecting into the chamber so that the chamber will be fluidly interconnected to a passage in the gage plug.

---

This invention relates to an improved pneumatic control system as well as to an improved control device for such a system or the like wherein the control device has means for measuring the pressure value of a pneumatic signal being directed thereto.

It is well known that various control devices have been provided in the past wherein a fluid pressure measuring gage is adapted to be coupled to a threaded bore thereof so as to provide pressure readings of a pneumatic signal that is fluidly connected to such threaded coupling means.

However, such prior known constructions each required the removing of a sealing screw from the threaded bore and the installing of a threaded gage adaptor into such bore each time the operator desired to check the magnitude of the pneumatic signal whereby not only is such prior known operation time consuming, but also such prior known constructions require complicated and expensing sealing means.

According to the teachings of this invention, however, a control arrangement is provided wherein the operator or the like is adapted to merely insert a gage plug of this invention into an opening of a control device in such a manner that the gage plug opens a valve seat of the control device and is fluidly interconnected to the pneumatic signal that is desired to be measured without requiring any manual coupling and decoupling operations as in the past, the control device of this invention completely sealing closed the opening in an automatic manner when the gage plug is subsequently removed so as to prevent fluid communication between the pneumatic signal and the atmosphere.

In particular, one embodiment of this invention provides a housing means having a chamber divided into two sections by a flexible diaphragm carried by the housing means, one of the chamber sections being adapted to be fluidly interconnected to an opening formed in the housing means and leading from a valve seat that projects into the one chamber section to the exterior of the housing means. The pneumatic signal to be measured is fluidly interconnected to the one chamber section and the flexible diaphragm has means operatively associated therewith to normally maintain the same in sealing engagement with the valve seat to prevent fluid communication between the one chamber section and the opening in the housing means. The measuring gage has a plug adaptor interconnected thereto which is adapted to be inserted into the opening of the housing and project through the valve seat to move the flexible diaphragm away from the valve seat so that the one chamber section is fluidly interconnected to a passage means of the gage plug and, thus, to the measuring gage for indicating the pressure of the pneumatic signal existing in the one chamber section. A second flexible diaphragm is carried by the housing means and spans the opening thereof in spaced relation to the first-named diaphragm, the second diaphragm having an aperture passing therethrough of an area smaller than the cross-sectional area of the gage plug so that when the gage plug is inserted in the opening and through the aperture, the gage plug expands the aperture in the second diaphragm so that the second diaphragm fully seals around the gage plug before the gage plug engages the first-named flexible diaphragm so as to provide a fluid seal in the opening between the two diaphragms.

Accordingly, it is an object of this invention to provide an improved control device having one or more of the novel features set forth above or hereinafter shown or described.

Another object of this invention is to provide an improved pneumatic control system having one or more of the novel features of this invention set forth above or hereinafter shown or described.

Other objects, uses and advantages of this invention are apparent from a reading of this description which proceeds with reference to the accompanying drawings forming a part thereof and wherein:

FIG. 3 is a view similar to FIG. 1 and illustrates another control device of this invention as utilized in another control system of this invention.

FIG. 4 is a view similar to FIG. 3 and illustrates the control device with the gage plug removed therefrom.

Figure 1:
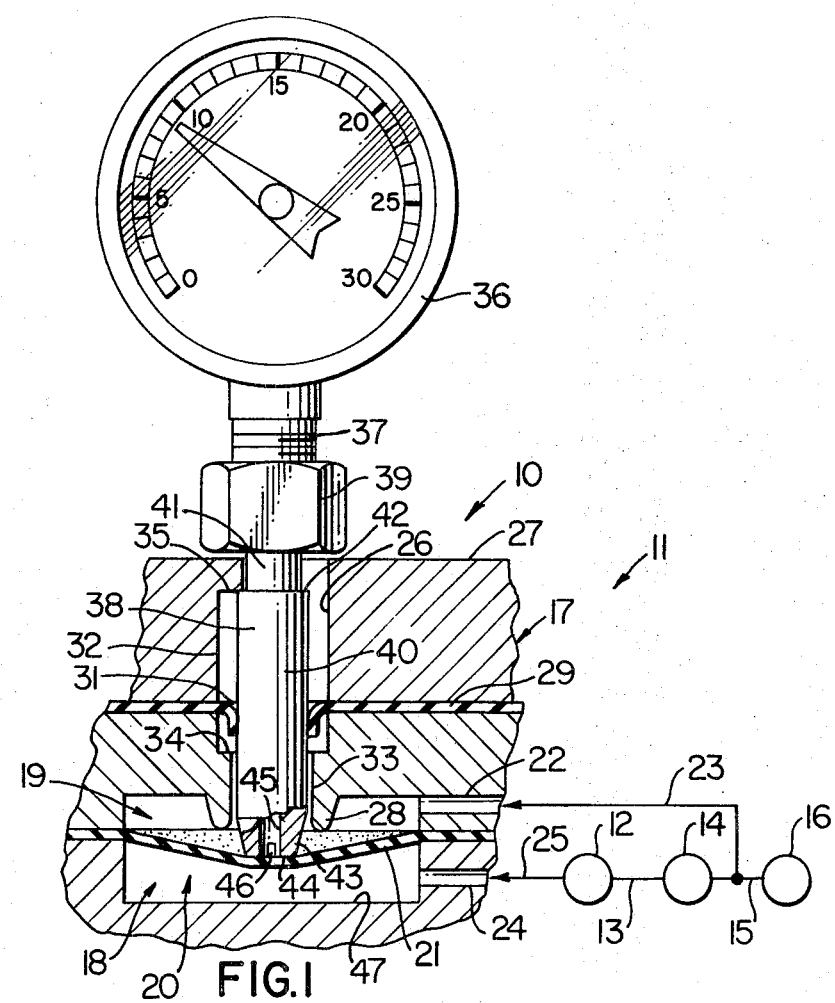
FIG. 1 is a fragmentary and schematic view, partially in cross-section, illustrating one embodiment of the improved control device of this invention as utilized in an improved pneumatic control system of this invention.

While the various features of this invention are hereinafter described and illustrated as being particularly adapted to provide gage measuring means for a pneumatic control system, it is to be understood that the various features of this invention can be utilized singly or in any combination thereof to provide gage measuring means for other systems as desired.

Therefore, this invention is not to be limited to only the embodiments illustrated in the drawings, because the drawings are merely utilized to illustrate one of the wide variety of uses of this invention.

Referring now to FIG. 1, the improved control device of this invention is generally indicated by the reference numeral 10 and is illustrated as being utilized in the improved pneumatic control system of this invention that is generally indicated by the reference numeral 11 and comprises, for example, a pneumatic pressure source 12 fluidly interconnected by a conduit means 13 to a condition responsive device 14 that is adapted to direct a pneumatic signal from the source 12 through a conduit means 15 to a pneumatically operated device 16 in proportion to a particular condition being sensed by the device 14.

For example, the pneumatically operated device 16 can comprise a pneumatically operated heat exchanger that has its output temperature effect increased upon an increase in the pneumatic signal being directed thereto by the condition responsive means 14 sensing a decrease in the output temperature effect of the heat exchanger means 16 below a selected temperature effect setting of the device 14. Conversely, the pneumatically operated heat exchanger device 16 decreases its output temperature effect upon a decrease of the pneumatic signal being directed thereto by the condition responsive means 14 sensing an output temperature effect of the heat exchanger means 16 above the selected temperature effect setting of the condition responsive means 14. In this manner, the condition responsive means 14 tends to maintain the output temperature effect of the pneumatically operated heat exchanger 16 at the selected setting of the device 14 in a manner well known in the art.

The control device 10 of this invention comprises a housing means 17 having a chamber 18 formed therein and being divided into two chamber sections 19 and 20 by a flexible diaphragm 21 carried by the housing means 17 in any suitable manner. The chamber section 19 is adapted to be always disposed in fluid communication with the pneumatic signal being directed by the condition responsive means 14 to the pneumatically operated heat exchanger 16 because the housing means 17 has passage means 22 formed therein that is fluidly interconnected to the one chamber 19 and is fluidly interconnected to the conduit 15 by a coupling conduit means 23. Similarly, the other chamber section 20 of the housing means 17 is adapted to always be in fluid communication with the pneumatic pressure source 12 because a passage means 24 is formed in the housing means 17 that leads to the chamber section 20 and is fluidly interconnected to the pneumatic pressure source 12 by a coupling conduit means 25.

Of course, it is to be understood that the parts and conduits of the system 11 of this invention could all be incorporated into the same housing means 17 of the control device 10 or parts thereof can be disposed external of the control device 10, as illustrated, if desired.

The housing means 17 has an opening 26 formed therein that leads from the exterior surface 27 thereof to the chamber 18, the housing means 17 having an annular valve seat 28 surrounding the opening 26 at the inner end thereof and projecting inwardly into the chamber section 19.

Figure 2:
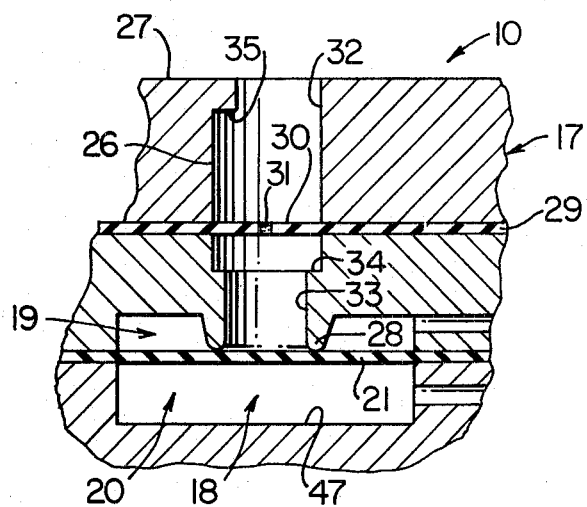
FIG. 2 is a view similar to FIG. 1 and illustrates the control device with the gage plug removed therefrom.

Since a higher pneumatic pressure is being directed by the pneumatic source 12 into the chamber section 20 of the control device 10 than the pressure value of the pneumatic signal being directed from the condition responsive means 14 to the control device 16 that is also directed into the chamber section 19 of the control device 10, such resulting pressure differential across the diaphragm 21 normally tends to maintain the flexible diaphragm 21 in the position illustrated in FIG. 2 where the flexible diaphragm 21 bears against the valve seat 28 to seal closed the opening 26 in the housing means 17 from the chamber section 19 whereby there is no leakage of the pneumatic signal being directed by the condition responsive means 14 to the control device 16 to the atmosphere out of the opening 26 of the control device 10 when the control device 10 is in the position illustrated in FIG. 2.

A second flexible diaphragm 29 is carried by the housing means 17 in any suitable manner and has a portion 30 thereof that spans the opening 26 in the housing means 17 in spaced relation above the first-named diaphragm 21. However, the flexible diaphragm 29 has a small aperture 31 passing therethrough in substantially the central region of the spanning portion 30 thereof for a purpose hereinafter described.

The opening 26 in the housing means 17 defines a first substantially cylindrical portion 32 fluidly interconnected to a smaller cylindrical portion 33 by an annular shoulder means 34, the smaller cylindrical portion 33 passing through the valve seat 28 as illustrated in FIG. 2. However, the opening 26 is so constructed and arranged that the same defines a small projection or shoulder means 35 at the upper end of the cylindrical portion 32 on just one side thereof for a purpose hereinafter described.

The improved fluid pressure measuring means of this invention is illustrated in FIG. 1 and comprises a conventional fluid pressure gage 36 having a hollow threaded nipple extension 37 through which the fluid pressure to be measured can be directed and the gage 36 will indicate on the face thereof the fluid pressure being received in the nipple extension 37 thereof in a conventional manner.

However, an improved gage plug or adaptor 38 of this invention is provided and has an enlarged end 39 internally threaded so as to be removably coupled to the nipple extension 37 of the gage 36 whereby the gage plug 38 can remain secured to the nipple extension 37 of the gage 36 to perform the measuring functions hereinafter described.

The gage plug or adaptor 38 has a cylindrical portion 40 coupled to the enlargement 39 by an intermediate and smaller cylindrical portion 41 that cooperates with the larger cylindrical portion 40 to define an annular abutment means or shoulder 42 for a purpose hereinafter described. The lower end 43 of the cylindrical portion 40 is substantially frusto-conical in configuration and has the smaller flat end 44 thereof interrupted by a central passage means 45 that leads from the end surface 44 completely through the adaptor or plug 38 so as to be coupled in fluid communication with the passage in the nipple extension 37 of the gage 36 when the gage 36 is secured to the adaptor 38 as illustrated in FIG. 1.

The end 43 of the gage plug 38 is provided with one or more radially disposed slots 46 that interconnect the central passage 45 to the exterior of the plug 38 adjacent the flat end surface 44 thereof for a purpose now to be described.

With the control device 10 coupled in the system 11 in the manner previously described and being in the position illustrated in FIG. 2 wherein the flexible diaphragm 21 seals against the valve seat 28 to prevent fluid communication between the chamber section 19 and the exterior of the control device 10, the operator or the like can check the pressure of the pneumatic signal being directed by the condition responsive means 14 to the pneumatically operated device 16 by merely inserting the gage plug 38 with its interconnected gage 36 downwardly through the opening 26 in the housing means 17 of the control device 10 whereby the conical end 43 of the plug 38 will first engage against the flexible diaphragm 29 at the small aperture 31 thereof and spread open the aperture 31 in the manner illustrated in FIG. 1 so that the plug 38 can pass therethrough and through the valve seat 28 to have the end wall 44 thereof engage against the flexible diaphragm 21 and move the same downwardly in opposition to the force of the pressure fluid in the chamber section 20 to open the flexible diaphragm 21 away from the valve seat 28 whereby the pressure fluid in the chamber section 19 is now in fluid communication with the opening 26 in the housing 17 because of the opened valve seat 28.

However, since the aperture 31 in the flexible diaphragm 29 normally has an area smaller than the cross-sectional area of the cylindrical portion 40 of the gage plug 38, the insertion of the gage plug 38 through the aperture 31 of the diaphragm 29 has caused the stretching of the diaphragm 29 about the plug 38 to completely fluid seal around the exterior surface of the cylindrical portion 40 of the gage plug 38 so that the opening 26 in the housing means 17 is sealed between the two diaphragms 29 and 21 whereby there is no escape of the fluid pressure in the chamber section 19 to the atmosphere even though the valve seat 28 has been opened in the manner illustrated in FIG. 1. In this manner, the passage means 45 of the gage plug 38 is disposed in fluid communication with the chamber section 19 because of the slots 46 therein so that the gage 36 will provide a true reading of the pressure of the fluid existing at that time in the chamber section 19.

By making the cross-sectional dimension of the enlargement 39 at the upper end of the gage plug 38 larger than a like cross-sectional dimension of the opening 26 in the housing means 17 at the top surface 27 thereof, the degree of insertion of the gage plug 38 into the opening 26 is limited by the enlargement 39 abutting against the top surface 27 of the housing means 17 whereby there is no danger of the operator inserting the gage plug 38 into the opening 26 to such an extent that the same would rupture the diaphragm 21 by compacting the diaphragm 21 against the end wall 47 of the chamber section 20.

Should it be desired to maintain the gage plug 38 in its inserted position as illustrated in FIG. 1 so as to provide continuous reading of the pressure value of the pneumatic signal in the chamber section 19, the gage plug 38 is inserted into the opening 26 a sufficient distance so that the annular abutment or shoulder 42 of the gage plug 38 clears the shoulder 35 of the housing means 17 whereby the plug 38 can then be pivoted to the left in FIG. 1 until the abutment shoulder 42 is disposed beneath the housing shoulder 35 as illustrated. In this manner, the fluid pressure in the chamber section 20 tending to move the flexible diaphragm 21 upwardly compacts the abutment shoulder 42 of the gage plug 38 against the housing shoulder 35 when the operator releases the gage plug 38 so that the gage plug 38 will remain in the inserted position illustrated in FIG. 1 to produce a continuous reading of the pressure value of the pressure fluid in the chamber section 19 until the operator pivots the gage plug 38 to the right in FIG. 1 to clear the abutment shoulder 42 from the housing shoulder 35.

Thus, it can be seen that the cross-sectional dimension of the cylindrical portion 40 of the gage plug 38 is smaller than the cross-sectional dimension of the opening 26 at the shoulder means 35 of the housing means 17 to permit insertion and removal of the gage plug 38 past the shoulder means 35 of the housing means 17, the shoulder means 35 merely providing means for maintaining the gage plug 38 in its inserted gage reading position in the housing means 17 so that the operator need not hold the gage plug 38 in its inserted position in opposition to the force acting on the diaphragm 21 tending to move the diaphragm 21 upwardly, as desired.

When the operator removes the gage plug 38 for any desired reason, such as to utilize the same gage plug 38 to measure the fluid pressure in other parts of the system 11 in the manner previously described, the removal of the gage plug 38 out through the opening 26 causes the diaphragm 21 to fully seat against the valve seat 28 before the plug 38 is removed from the stretched aperture 31 of the diaphragm 29 so that it can be seen that the chamber section 19 is fully sealed from the opening 26 in the housing means 17 by the diaphragm 21 before the sealing relationship between the flexible diaphragm 29 and the gage plug 38 is terminated during the removal of the gage plug 38 from the opening 26 of the control device 10.

Therefore, it can be seen that this invention provides means for readily measuring the pressure of a pneumatic signal or the like without requiring the conventional seal screw and threaded gage plug adaptor as has been provided in the past. Further, this invention has the advantage that pressure readings may be obtained quickly and positively without the design of extra parts within the gage 36 whereby no external assembly operations need be performed. In addition, the sealing arrangement provided by the flexible diaphragm 29 is such that no O-rings or other sealing devices are required on the adaptor 38 which might wear out during continual use thereof.

Another embodiment of the control device of this invention is generally indicated by the reference numeral 10A in FIG. 3 and is illustrated as being utilized in another pneumatic control system of this invention generally indicated by the reference numeral 11A, the parts of the control device 10A and control system 11A that are similar to the parts of the previously described control device 10 and system 11 are indicated by like reference numerals followed by the reference letter A.

As illustrated in FIG. 3, the housing means 17A of the control device 10A is formed substantially identical to the housing means 17 previously described except that the chamber section 19A is not fluidly interconnected to a passage means in the housing means 17A similar to the passage 22 previously described.

Instead, the pneumatic signal to be measured is fluidly interconnected to the chamber section 20A because the coupling conduit 23A of the system 11A is fluidly interconnected to a passage means 48 formed in the housing means 17A and leading directly to the chamber section 20A.

However, the flexible diaphragm 21A has a plurality of opening means 49 passing therethrough in offset relation to the valve seat 28A so as to always fluidly interconnect the chambers 20A and 19A together regardless of the operating position of the flexible diaphragm 21A whereby the pneumatic signal being directed from the condition responsive device 14A to the pneumatically operated control device 16A from the pneumatic source 12A is always in fluid communication with the chamber 19A and can be measured by the interconnected gage plug 38A and gage 36A in the manner previously described for the control device 10.

In particular, it can be seen that since the effective area of the under side 50 of the diaphragm 21A is larger than the effective area on the upper side 51 of the diaphragm 21A and since both sides 50 and 51 of the diaphragm 21A are exposed to the pressure fluid in the chamber 18A, such differential in pressure across the diaphragm 21A tends to maintain the diaphragm 21A in its closed position against the valve seat 28A in the manner illustrated in FIG. 4.

However, it might be desirable to utilize a low load bias spring 52 in the manner illustrated in FIGS. 3 and 4 to tend to bias the diaphragm 21A upwardly against the valve seat 28A to prevent initial fluid pressure leakage when the pneumatic signal being supplied to the chamber 18A is being initially supplied thereto at a relatively slow rate.

Accordingly, it can be seen that the embodiment of this invention that is provided in FIGS. 3 and 4 which has all of the advantages previously described in connection with the arrangement of FIGS. 1 and 2.

Therefore, it can be seen that not only does this invention provide an improved control arrangement for measuring fluid pressure in a simple and effective manner, but also this invention provides an improved pneumatic control system wherein a pneumatic signal can have the pressure value thereof readily measured in a simple and effective manner.

What is claimed is:

1. In combination, a housing means having a chamber divided into two sections by a flexible diaphragm carried by said housing means, said housing means having an opening therein leading from one of said chamber sections to the exterior of said housing means whereby said opening is adapted to receive a gage plug for measuring fluid pressure in said one chamber section, said housing means having a valve seat surrounding said opening and projecting into said one chamber section to be opened and closed by said flexible diaphragm, and means carried by said housing means for tending to normally maintain said flexible diaphragm in a closed position against said valve seat to prevent fluid communication between said one chamber section and said opening until said gage plug is inserted into said opening and through said valve seat to move said flexible diaphragm away from said valve seat.

2. A combination as set forth in claim 1 wherein said last-named means comprises spring means disposed in the other chamber section to urge said flexible diaphragm toward said valve seat.

3. A combination as set forth in claim 1 wherein said last-named means comprises passage means in said housing means for directing fluid under pressure to the other chamber section to urge said flexible diaphragm toward said valve seat.

4. A combination as set forth in claim 1 wherein said flexible diaphragm seals said one chamber section from the other chamber section in all of its operating positions.

5. A combination as set forth in claim 1 wherein said flexible diaphragm has opening means passing therethrough in offset relation relative to said valve seat to fluidly interconnect said one chamber section to the other chamber section in all of its operating positions.

6. A combination as set forth in claim 1 wherein said housing means has a shoulder means projecting into said opening thereof in spaced relation from said valve seat to hold said gage plug in position in said opening.

7. A combination as set forth in claim 1 wherein said housing means carries another flexible diaphragm that spans said opening thereof in spaced relation to said first-named flexible diaphragm, said other flexible diaphragm having an aperture passing therethrough smaller in area than the cross-sectional area of said gage plug so that when said gage plug is inserted in said opening and through said aperture to engage against said first-named diaphragm to open said valve seat, said other diaphragm seals against the exterior of said gage plug to seal said opening between said diaphragms from the exterior of said housing means.

8. In a pneumatic control system having a pneumatic signal that is to be measured, the improvement comprising a housing means having a chamber divided into two sections by a flexible diaphragm carried by said housing means, means fluidly interconnecting said pneumatic signal to one of said chamber sections, said housing means having an opening therein leading from said one chamber section to the exterior of said housing means whereby said opening is adapted to receive a gage plug for measuring the fluid pressure of said pneumatic signal in said one chamber section, said housing means having a valve seat surrounding said opening and projecting into said one chamber section to be opened and closed by said flexible diaphragm, and means carried by said housing means for tending to normally maintain said flexible diaphragm in a closed position against said valve seat to prevent fluid communication between said one chamber section and said opening until said gage plug is inserted into said opening and through said valve seat to move said flexible diaphragm away from said valve seat.

9. In a pneumatic control system as set forth in claim 8 the further improvement wherein said last-named means comprises spring means disposed in the other chamber section to urge said flexible diaphragm toward said valve seat.

10. In a pneumatic control system as set forth in claim 8, the further improvement wherein said last-named means comprises passage means in said housing means for directing fluid under pressure to the other chamber section to urge said flexible diaphragm toward said valve seat.

11. In a pneumatic control system as set forth in claim 8, the further improvement wherein said flexible diaphragm seals said one chamber section from the other chamber section in all of its operating positions.

12. In a pneumatic control system as set forth in claim 8, the further improvement wherein said flexible diaphragm has opening means passing therethrough in offset relation relative to said valve seat to fluidly interconnect said one chamber section to the other chamber section in all of its operating positions.

13. In a pneumatic control system as set forth in claim 8, the further improvement wherein said housing means has a shoulder means projecting into said opening thereof in spaced relation from said valve seat to hold said gage plug in position in said opening.

14. In a pneumatic control system as set forth in claim 8, the further improvement wherein said housing means carries another flexible diaphragm that spans said opening thereof in spaced relation to said first-named flexible diaphragm, said other flexible diaphragm having an aperture passing therethrough smaller in area than the cross-sectional area of said gage plug so that when said gage plug is inserted in said opening and through said aperture to engage against said first-named diaphragm to open said valve seat, said other diaphragm seals against the exterior of said gage plug to seal said opening between said diaphragms from the exterior of said housing means.

15. In combination, a housing means having a chamber divided into two sections by a flexible diaphragm carried by said housing means, said housing means having an opening therein leading from one of said chamber sections to the exterior of said housing means, said housing means having a valve seat surrounding said opening and projecting into said one chamber section to be opened and closed by said flexible diaphragm, means carried by said housing means for tending to normally maintain said flexible diaphragm in a closed position against said valve seat to prevent fluid communication between said one chamber section and said opening, and a measuring gage having a plug removably disposed in said opening, said plug having an end passing through said valve seat and bearing against said flexible diaphragm to hold said diaphragm away from said valve seat and thereby provide fluid communication between said one chamber section and said bore, said plug having passage means providing fluid communication between said gage and said opened valve seat whereby said gage measures the fluid condition existing in said one chamber section.

16. A combination as set forth in claim 15 wherein said housing means has a shoulder means projecting into said opening thereof in spaced relation from said valve seat, said plug having an abutment means disposed between said valve seat and said shoulder means and engaging against said shoulder means to hold said plug in said opening.

17. A combination as set forth in claim 16 wherein said flexible diaphragm bearing against said end of said plug urges said abutment means against said shoulder means.

18. A combination as set forth in claim 16 wherein said opening in said housing has a cross-sectional configuration at said shoulder means larger than the cross-sectional configuration at the abutment means of said plug so that said plug can clear said shoulder means upon insertion and removal of said plug into and from said opening of said housing means.

19. A combination as set forth in claim 15 wherein said passage means of said plug interrupts said end thereof, said end of said plug having transverse slot means therein to fluidly interconnect said passage means at said end to the exterior of said plug even though said end of said plug is bearing against said diaphragm.

20. A combination as set forth in claim 15 wherein said housing means carries another flexible diaphragm that spans said opening thereof in spaced relation to said first-named flexible diaphragm, said other flexible diaphragm having an aperture passing therethrough receiving said plug, said aperture normally having an area smaller than the cross-sectional area of said plug so that said other diaphragm seals to said plug at said aperture to seal said opening of said housing means between said diaphragms from the exterior of said housing means.

21. In a pneumatic control system having a pneumatic signal to be measured, the improvement comprising a housing means having a chamber divided into two sections by a flexible diaphragm carried by said housing means, said housing means having an opening therein leading from one of said chamber sections to the exterior of said housing means, means fluidly interconnecting said pneumatic signal to said one chamber section, said housing means having a valve seat surrounding said opening and projecting into said one chamber section to be opened and closed by said flexible diaphragm, means carried by said housing means for tending to normally maintain said flexible diaphragm in a closed position against said valve seat to prevent fluid communication between said one chamber section and said opening, and a measuring gage having a plug removably disposed in said opening, said plug having an end passing through said valve seat and bearing against said flexible diaphragm to hold said diaphragm away from said valve seat and thereby provide fluid communication between said one chamber section and said bore, said plug having passage means providing fluid communication between said gage and said opened valve seat whereby said gage measures the fluid condition of said pneumatic signal that exists in said one chamber section.

22. In a pneumatic control system as set forth in claim 21, the further improvement wherein said housing means has a shoulder means projecting into said opening thereof in spaced relation from said valve seat, said plug having an abutment means disposed between said valve seat and said shoulder means and engaging against said shoulder means to hold said plug in said opening.

23. In a pneumatic control system as set form in claim 22, the further improvement wherein said flexible diaphragm bearing against said end of said plug urges said abutment means against said shoulder means.

24. In a pneumatic control system as set forth in claim 22, the further improvement wherein said opening in said housing has a cross-sectional configuration at said shoulder means larger than the cross-sectional configuration at the abutment means of said plug so that said plug can clear said shoulder means upon insertion and removal of said plug into and from said opening of said housing means.

25. In a pneumatic control system as set forth in claim 21, the further improvement wherein said passage means of said plug interrupts said end thereof, said end of said plug having transverse slot means therein to fluidly interconnect said passage means at said end to the exterior of said plug even though said end of said plug is bearing against said diaphragm.

26. In a pneumatic control system as set forth in claim 21, the further improvement wherein said housing means carries another flexible diaphragm that spans said opening thereof in spaced relation to said first-named flexible diaphragm, said other flexible diaphragm having an aperture passing therethrough receiving said plug, said aperture normally having an area smaller than the cross-sectional area of said plug so that said other diaphragm seals to said plug at said aperture to seal said opening of said housing means between said diaphragms from the exterior of said housing means.

References Cited

UNITED STATES PATENTS

| 2,618,978 | 11/1952 | Ragland | 73—420 |
| 2,871,907 | 2/1959 | Loofbourrow | 137—223 X |
| 3,041,880 | 7/1962 | McCarvell et al. | 73—420 |

FOREIGN PATENTS

| 801,735 | 9/1958 | Great Britain. |
| 944,496 | 12/1963 | Great Britain. |

S. CLEMENT SWISHER, Primary Examiner

JOSEPH W. ROSKOS, Assistant Examiner

U.S. Cl. X.R.

137—223